United States Patent [19]

Mermi et al.

[11] Patent Number: 4,575,294
[45] Date of Patent: Mar. 11, 1986

[54] ANCHORING BOLT

[75] Inventors: Kurt Mermi, Teningen; Danilo Sternisa, Emmendingen; Albert Frischmann, Teningen, all of Fed. Rep. of Germany

[73] Assignee: Upat GmbH & Co., Emmendingen, Fed. Rep. of Germany

[21] Appl. No.: 604,615

[22] PCT Filed: Jul. 30, 1983

[86] PCT No.: PCT/DE83/00133
§ 371 Date: Apr. 9, 1984
§ 102(e) Date: Apr. 9, 1984

[87] PCT Pub. No.: WO84/00793
PCT Pub. Date: Mar. 1, 1984

[30] Foreign Application Priority Data

Aug. 9, 1982 [DE] Fed. Rep. of Germany ....... 3329633

[51] Int. Cl.[4] ............................................. F16B 13/06
[52] U.S. Cl. ...................... 411/30; 175/287; 175/289; 408/144; 408/170; 408/180; 411/54; 411/77
[58] Field of Search .............. 411/29, 30, 31, 54, 411/75, 76, 77, 78; 408/144, 145, 168, 169, 170, 171, 180; 175/284, 286, 287, 289

[56] References Cited

U.S. PATENT DOCUMENTS

| | | | |
|---|---|---|---|
| 833,240 | 10/1906 | Potter | 175/289 |
| 1,281,519 | 10/1918 | clark | 408/168 |
| 1,762,349 | 6/1930 | Phillips | 411/31 |
| 2,511,650 | 6/1950 | Robinson | 175/287 X |
| 2,650,476 | 9/1953 | Crockett | 411/77 |
| 2,692,758 | 10/1954 | Curry et al. | 175/289 |
| 2,697,914 | 12/1954 | Joy | 411/77 |
| 2,963,935 | 12/1960 | Shields | 411/31 |
| 3,202,035 | 8/1965 | Rosselet | 411/31 |
| 4,091,882 | 5/1978 | Hashimoto | 411/30 X |
| 4,518,290 | 5/1985 | Frichmann et al. | 411/30 |

FOREIGN PATENT DOCUMENTS 238492 1/1961 Australia ............................... 411/31

Primary Examiner—Thomas J. Holko
Attorney, Agent, or Firm—Frishauf, Holtz, Goodman & Woodward

[57] ABSTRACT

An anchoring bolt (1), which can produce a conical undercut by rotation in a cylindrical hole and serves simultaneously as a securing element has a connection portion (2), a shaft (4) and an insertion portion (5). The insertion portion (5) has an axially extending slot (6) forming two spreadable branches (8,9), into which slot a movable spreading wedge (18) can be driven in with its tapered end. The branches (8, 9) are each provided with drillings (14, 15) receiving hard metal pins (16, 17) of which the front edges, in the rotation direction, are more protuberant than the rear edges so as to form a clearance angle α.

9 Claims, 4 Drawing Figures

ANCHORING BOLT

The invention concerns an anchoring bolt by which a conical undercutting can be produced when it is driven like a drill bit into a cylindrical hole, the anchor bolt having a connecting portion, a shaft and an insertion portion, the latter having an axially extending slot forming two spreadable branches, into which slot an axially movable spreading wedge is inserted by its tapered end, and having, on the end of the insertion portion away from the shaft, at least two inserts lying radially opposite to each other.

BACKGROUND AND PRIOR ART

Such an anchoring bolt is described in the as yet unpublished patent application P No. 31 39 174.5-12 of the assignee of this application and serves simultaneously as a securing element and as a drill bit or reamer. The inserts, by which reaming of the bore walls is obtained when the insertion portion is put down over the spreading wedge, are set at right angles to the longitudinal axis of the anchoring bolt in the case of the known anchoring bolt and they are located diametrically opposite each other.

SUMMARY OF THE INVENTION

Proceeding from this state of the art, the invention has the object of providing an anchoring bolt of the above-mentioned kind which utilizes the cutting effect of the hard metal inserts optimally and produces an undercut that optimally corresponds to the spreading angle produced by the wedge at the insertion end of the anchoring bolt.

This object is attained according to the invention by disposing the inserts obliquely with respect to the axis of the bolt at the end face of its insertion portion and by the fact that their edges facing forward in the direction of rotation project outward farther than the edges facing rearward with respect to the rotation direction.

Because of the fact that the forward cutting edges project farther out, it is these edges which mainly produce the reaming out of the bore walls. They produce a clearance angle that prevents scraping of the edges facing rearward and accordingly leads to a reduction of the cutting resistance and trouble-free displacement of the cuttings.

The inserts are preferable cylindrical hard metal pins of round section shape which are set in seating bores which extend at an angle of inclination of about 60° to the direction of the bolt axis. In a preferred embodiment of the invention the end face of the insertion portion is formed as a slotted cone frustum from the conical surfaces of which the hard metal pins project, the frustum being divided into two parts by the slot. The hard metal pins are offset by a certain amount in the direction of rotation on opposite sides of a first plane that passes through the longitudinal axis of the insertion portion of the anchoring rod and extends at right angles to the slot. The longitudinal axes of the hard metal pins lie respectively in a second and a third plane at a spacing from the first plane corresponding to the offset.

An efficient utilization of the cutting edges results when the hard metal pins are imitially adhesively bonded into the seating bores in such a way that they can turn on their own axes during the drilling process for shaping out the undercut.

BRIEF DESCRIPTION OF THE DRAWINGS

The invention is further explained by way of an illustrative embodiment with reference to the drawing, in which.

DESCRIPTION OF THE ILLUSTRATED EMBODIMENT

Figure 1:
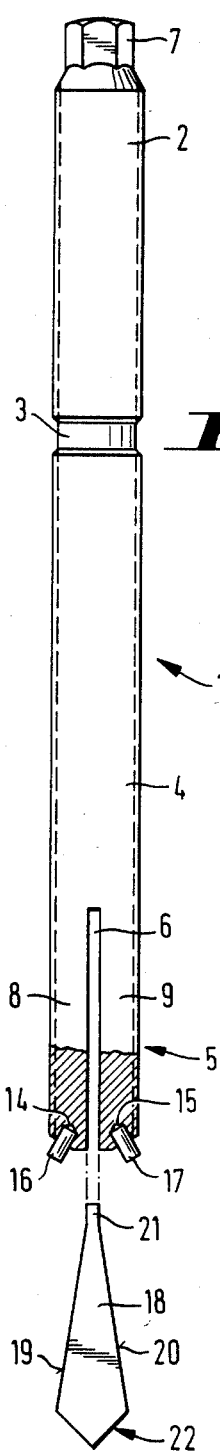
FIG. 1 is a side view of the anchoring rod, partly in section.

The anchoring bolt, designated 1 as a whole consists essentially of a threaded rod and has a connection portion to a threading-free setting depth marking strip 3, a shaft 4 and an insertion portion 5 provided with a slot 6. An externally hexagonal tip 7 which serves as the driven element for a setting tool is made integral with the connection portion 2.

Figure 2:
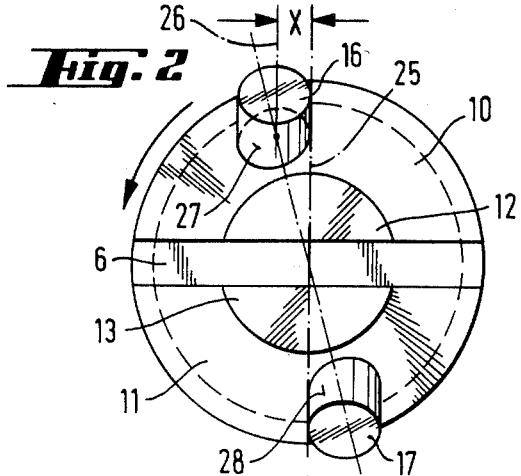
FIG. 2 is an end view of the end face of the insertion end of the anchoring rod according to FIG. 1.

The slot 6 extends from the front end of the anchoring bolt 1 axially and in a median fashion through the insertion portion 5. Two spreadable branches or legs 8 and 9 are thereby formed. At the front end the spreadable legs 8 and 9, as shown particularly in FIGS. 1 and 2, provide a cone frustum which is divided by the slot 6 into cone frustum sections 10 and 11 having roof surfaces 12 and 13.

Seating bores 14 and 15 for cylindrical hard metal pins 16 and 17 having an angle of inclination of preferably 60° are provided in the lateral surface of the cone frustum sections 10 and 11.

With the slot 6 is associated a spreading wedge 18 with wedge surfaces 19 and 20 which at their narrow end lead into an extension 21 and at their wide end into a roof cut 22. In order to deliver to the user the anchoring rod 1 and the spreading wedge 8 as a connected set, the spreading wedge 18 can be clamped in the slot 6 by the extension 21. The wedge surfaces 19 and 20 of the spreading wedge 18 form a wedge angle which, for example, is from 2° to 4° for a fastening ground of concrete.

Figure 4:
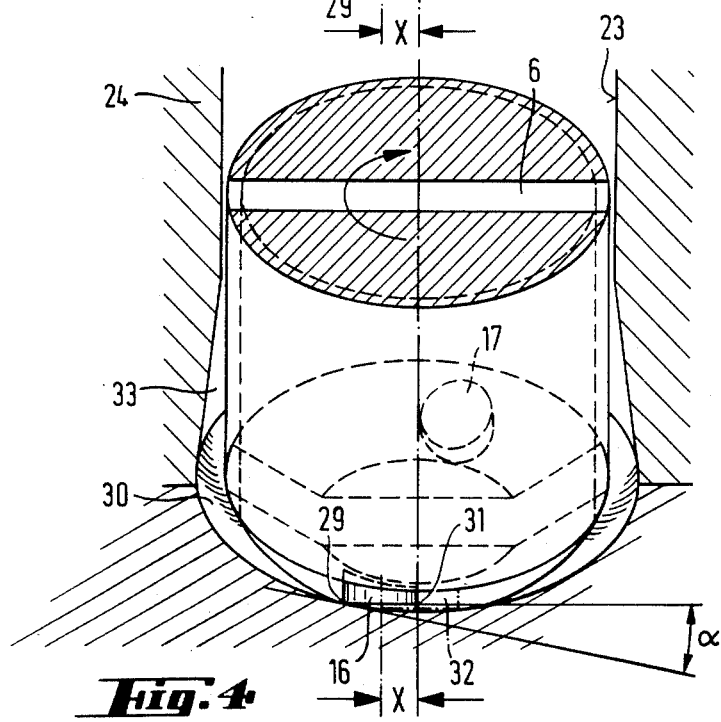
FIG. 4 shows the bottom of the bore hole, in a median vertical section joining at the bottom with a horizontal section, and so as to provide a schematic oblique view of a sectioned off tip of the anchoring bolt, inserted in the hole and already spread, although not showing the wedge, illustrating.

As a preparatory step for the setting operation for the anchoring rod 1, a cylindrical bore 23 is first made in a fastening ground 24 as partly shown in FIG. 4. Then a synthetic resin mortar packet can be inserted into the bore 23 if the anchoring bolt 1 is to be supplementarily cemented. When the anchoring bolt 1, together with the spreading wedge 18 clamped in the slot 6, is introduced into the bore 23 under rotary-percussive movement and continuous axial pressure, any mortar packet that may have been inserted in the bore is ruptured and when the spreading wedge 18 reaches the bottom of the cylindrical bore 23, it is pushed between the spreadable legs 8 and 9, so that the rotating hard metal pins 16 and 17 are pressed radially outward. In that way the hard metal pins 16 and 17 bear against the bore circumference in a manner corresponding to the spreading produced by the spreading wedge 18. The spreading wedge 18, in the course of producing the undercut effected by the removal of material, is driven far into the slot 6 until the maximum spread is reached. At that time, the intended undercut is performed and a shaped interlocked connection between the anchoring bolt 1 and the undercut bore hole 33 is obtained.

In order to produce an effective cutting away of the bore walls by the hard metal pins 16 and 17, the latter are not simply disposed symetrically to the slot 7 respectively in the middle of the cone frustum sections 10 and 11, but are laterally offset. The special disposition of the hard metal pins 16 and 17 is shown in FIG. 2 where a dot-dash line 25 can be seen which shows a median first plane which extends at right angles to the slot 6 in the longitudinal direction of the anchoring rod 1 and divides the anchoring rod 1 into right-hand and left-hand halves. The line 26 indicates a second plane that runs at a spacing X from the plane designated by the line 25. The seating bore 14 and the hard metal pin 16 are so disposed that the longitudinal axis of the hard metal pin 16 lies in the plane indicated by the line 26. This plane offset from the median plane is shown shaded in FIG. 1 at the lower end of the anchoring bolt 1 to the right of the slot 6. The plane shown shaded at the left of the slot 6 corresponds to a third plane related to the hard metal pin 17 and is offset by a spacing X to the rear with respect to the observer of FIG. 1 from the median lengthwise plane indicated by the line 25.

On account of the tilt-free offset of the hard metal pins 16 and 17 by the spacing X their lateral surfaces 27 project farther out of the lateral surface of the cone frustum sections 10 and 11 on the sides of the pins which are their leading sides in the direction of rotation so that the clearance angle α shown in FIG. 4 is obtained.

As can be recognized from FIG. 4, the hard metal pin 16 touches the bore boundary 30 only with its forwardly directed edge 29. The edge 31 directed to the rear with respect to the rotation direction is set back from the bore wall 30 as the result of the clearance angle α so that a trouble-free material removal and reduced cutting resistance is obtained compared to a pin configuration 32 which is shown in dot-dash lines in FIG. 4.

The pin 32 shown in dot-dash lines in FIG. 4 corresponds to a symetrical disposition on the plane indicated by the line 25. As can be recognized in FIG. 4, such a pin 32 touches the bore hole wall 30 both with its front edge and with its rear edge. The rearwardly directed edge thereby increases unfavorably the cutting resistance by scraping and pressing. In the configuration of the invention, only the forwardly facing edge touches the bore hole wall 30 and it can therefore fulfill the function of a cutter more effectively.

Figure 3:
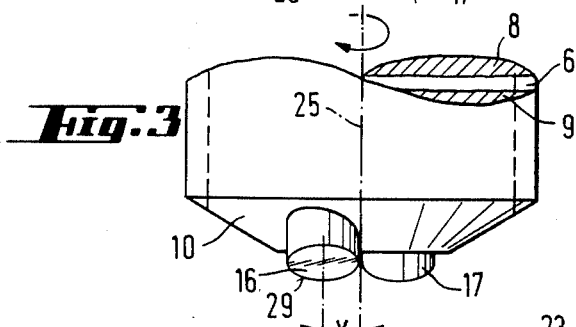
FIG. 3 shows the front end of the insertion portion of the anchoring rod, in a side view

FIG. 3 shows the special disposition of the hard metal pins 16 and 17 in perspective in a side view. In this representation it can be seen that the seating bores 14 and 15 for the hard metal pins 16 and 17 can be bored into the respective cone frustum sections 10 and 11 simply by shifting the obliquely oriented drill by the distance X relative to the median longitudinal plane indicated by the line 25.

The hard metal pins 16 and 17 are not pressed into the seating bores 14 and 15 but are adhesively held therein. By this provision the result is obtained that the hard metal pins 16 and 17 do not fall out during the introduction of the anchoring bolt 1 into the cylindrical bore 23, but during the reaming operation for producing the undercut 33, they can turn about their axes. A uniform wearing of the edging of the hard metal pins 16 and 17 operating as cutting edges thereby results. Since the anchoring bolt 1 remains in the widened bore hole after the boring operation, it is not necessary to fix the hard metal pins 16 and 17 firmly in their respective seating bores 14 and 15.

We claim:

1. Anchoring bolt for rotatable insertion into a cylindrical bore and capable of conically undercutting said bore and securing itself in the undercut bore, comprising a shaft, a connection portion extending from said shaft at one end thereof for connections to the bolt outside of the bore in which the bolt may be set, an insertion portion extending from said shaft at the other end thereof for insertion in a bore along with at least part of said shaft, said insertion portion having a slot running axially and separating said insertion portion into two branches capable of being spread apart from each other, a spreading wedge having its tapered-down end extending into said slot, and a plurality of protuberant inserts near the free end of said insertion portion projecting from said insertion portion;

said inserts (16,17) being set in the end face (11,12) of said insertion portion (5) and respectively having median lines in the direction of projection from said end face which are obliquely inclined to the direction of the longitudinal axis of said insertion portion and of said shaft, and the protuberant ends of said inserts having leading edge portions (29) in the direction of rotation of said bolt, which project further from said insertion portion than their trailing edge portions (31).

2. Anchoring bolt according to claim 1, in which said inserts are cylindrical hard metal pins (16,17) of circular cross-section and are seated in bores running directions at an inclination angle of about 60° with the direction of said longitudinal axis of said insertion portion, being held in said bores only by an adhesive used to hold them in place before the bore is placed in a hole for setting it therein.

3. Anchoring bolt according to claim 1, in which said end face of said insertion portion has the configuration of a cone frustum traversed by said slot passing through the cone axis and divided into two parts by said slot, and in which said inserts project from the conical surface of said frustum.

4. Anchoring bolt according to claim 2, in which said end face of said insertion portion has the configuration of a cone frustum traversed by said slot passing through the cone axis and divided into two parts by said slot, and in which said hard metal pins project from the conical surface of said frustum.

5. Anchoring bolt according to claim 1, in which said inserts are even in number and half of them are set in each of said branches of said insertion portion separated by said slot.

6. Anchoring bolt according to claim 1 in which said inserts are two in number, one of them being set in each of said branches of said insertion portion, their median lines in the directions in which they project from said branches lying in parallel planes respectively offset by the same spacing (x) in opposite directions from the longitudinal axis of said insertion portion, said planes being parallel to a plane passing through said axis and extending at right angles to said slot.

7. Anchoring bolt according to claim 2 in which said hard metal pins are two in number, located on opposite sides of said slot, have respective longitudinal axes which are inclined at about 60° to the direction of the axis of said insertion portion and which lie in parallel planes respectively offset by the same spacing (x) in opposite directions from said insertion portion axis, said planes being parallel to a plane passing through said insertion portion axis and extending at right angles to said slot.

8. Anchoring bolt according to claim 3 in which there are two said inserts, one projecting from the conical surface of each division of said cone frustum produced by said slot opposite sides of the slot, said inserts being set in to said cone frustum divisions with their median lines in their respective directions of projection lying in parallel planes respectively offset by the same spacing (x) in opposite directions from the longitudinal axis of said insertion portion, said planes being parallel to a plane passing through said axis and extending at right angles to said slot.

9. Anchoring bolt according to claim 4, in which there are two said hard metal pins, one projecting from the conical surface of each division of said cone frustum produced by said slot on opposite sides of the slot, having respective longitudinal axes which are obliquely inclined at about 60° to the direction of the axis of said insertion portion and lie in parallel planes respectively offset by the same spacing (x) in opposite directions from said insertion portion axis, said planes being parallel to a plane passing through said insertion portion axis and extending at right angles to said slot.

* * * * *